United States Patent
Lindgren et al.

(10) Patent No.: US 8,086,353 B2
(45) Date of Patent: Dec. 27, 2011

(54) HEATING SYSTEM CONTROL BASED ON REQUIRED HEATING POWER

(75) Inventors: Matts Lindgren, Västra Frölunda (SE); Peter Gummérus, Nödinge (SE)

(73) Assignee: Nordio Goteborg AB, Vastra Frolunda (SE)

( * ) Notice: Subject to any disclaimer, the term of this patent is extended or adjusted under 35 U.S.C. 154(b) by 316 days.

(21) Appl. No.: 12/448,641

(22) PCT Filed: Feb. 6, 2008

(86) PCT No.: PCT/EP2008/051466
§ 371 (c)(1),
(2), (4) Date: Aug. 27, 2009

(87) PCT Pub. No.: WO2008/095963
PCT Pub. Date: Aug. 14, 2008

(65) Prior Publication Data
US 2010/0059598 A1 Mar. 11, 2010

(30) Foreign Application Priority Data
Feb. 8, 2007 (EP) .................................. 07101976

(51) Int. Cl.
*G05B 13/02* (2006.01)
*G05D 23/00* (2006.01)
*G06G 7/48* (2006.01)

(52) U.S. Cl. ............................... 700/278; 700/31; 703/7

(58) Field of Classification Search .................. 700/28, 700/29, 31, 46, 276, 278, 300; 703/7
See application file for complete search history.

(56) References Cited

U.S. PATENT DOCUMENTS

| | | |
|---|---|---|
| 4,089,462 A | 5/1978 | Bradford |
| 4,897,798 A * | 1/1990 | Cler ............................... 700/276 |
| 5,115,967 A * | 5/1992 | Wedekind ..................... 236/46 R |
| 6,439,469 B1 | 8/2002 | Gruber et al. |
| 2005/0171645 A1 * | 8/2005 | Oswald et al. ................. 700/276 |

FOREIGN PATENT DOCUMENTS

| | | |
|---|---|---|
| EP | 1 956 460 | 10/2008 |
| WO | WO 91/16576 | 10/1991 |
| WO | WO 02/090832 | 11/2002 |

\* cited by examiner

*Primary Examiner* — Sean Shechtman
(74) *Attorney, Agent, or Firm* — Harness, Dickey & Pierce, P.L.C.

(57) ABSTRACT

A control system and method for controlling an indoor heating system for an indoor environment of a building in accordance with a desired indoor temperature, comprising a sensor (18) for detecting an outdoor temperature, a sensor (17) for detecting a in return temperature $T_{return}$ of a heat carrying medium circulated in a heat distribution system with a flow rate, and a controller (13). The controller is adapted to determine a required heating power $P_{req}$ to be delivered by the heat distribution system to maintain a heating power balance according to $P_{req}=P_{loss}-P_{source}$, where $P_{loss}$ is an approximation of heating power losses from the building, and includes a dynamic approximation of heating power transfer through walls of the building, based on at least the desired indoor temperature, the detected outdoor temperature, a heat transfer coefficient of the wall, and a heat capacity of the wall, and $P_{source}$ is an approximation of heating power sources external to the heating system, and, based on the detected return temperature, control a combination of forward flow temperature and flow rate so as to ensure that the distribution system delivers the required heating power. According to the present invention, a dynamic model of the heating power balance of the building is used to control the heating power delivered by the heating system. This results in improved control compared a control scheme based only on flow temperature control based on outdoor temperature.

20 Claims, 2 Drawing Sheets

HEATING SYSTEM CONTROL BASED ON REQUIRED HEATING POWER

FIELD OF THE INVENTION

The present invention relates to heating systems, and more specifically to heating systems where a central heating unit controls the flow of a heat carrying medium in a heat distribution system.

BACKGROUND OF THE INVENTION

Traditional indoor temperature control, such as implemented in a water carried heating system, is based on a simple relationship between the outdoor and the forward heat carrier temperature. Typically the controller is provided with a number of preset curves, often composed of one or several lines with specified slope, offset, and possibly intersection points. The user then selects a curve that corresponds to the characteristics of the building. Optimization is normally done by trial and error during a calibration period.

A problem with such calibration is that a building hardly ever is in equilibrium, with the environment (the weather variations are normally faster than the time constants of the building). Therefore, it is typically very difficult to determine a suitable slope and offset.

In recent years, it has been suggested to model the heat transfer between the building and the environment, and use this model in the control process. On example of this is described by the Swedish Metrology and Hydrology Institute (SMHI) and marketed by Honeywell under the name Weathergain. According to this system, the house model, and predictions of the future climate variations, are used to convert the current outdoor temperature into an "equivalent" outdoor temperature. This "equivalent" outdoor temperature is then supplied to a traditional control system, making it slightly more efficient.

Another example is given in U.S. Pat. No. 6,439,469, where a model of the house heat exchange and weather predictions are used for a predictive control of flow temperature.

Document WO 91/16576 describes a method for controlling a heat generating appliance by monitoring flow and return temperatures of the heated fluid, the flow rate, room temperature and external ambient temperature.

Document U.S. Pat. No. 4,089,462 describes a temperature control system arranged to shift the control point in accordance with the ambient temperature and the K-factor of the room in which the system is operating.

SUMMARY OF THE INVENTION

An object of the present invention is to overcome some of the mentioned problems, and to provide an improved control system for an indoor heating system, enabling a more energy efficient indoor heating.

This and other objects are achieved by a control system for controlling an indoor heating system for a building in accordance with a desired indoor temperature, comprising:

a sensor for detecting an outdoor temperature, a sensor for detecting a return temperature of a heat carrying medium circulated in a heat distribution system with a flow rate, a controller adapted to:

determine a required heating power $P_{req}$ to be delivered by said heat distribution system to maintain a heating power balance according to $P_{req}=P_{loss}-P_{source}$, where $P_{loss}$ is an approximation of heating power losses from the building, and includes a dynamic approximation of heating power transfer through walls of the building, based on at least said desired indoor temperature, said detected outdoor temperature, a heat transfer coefficient of the wall, and a heat capacity of the wall, and $P_{source}$ is an approximation of heating power sources external to said heating system, and based on the detected return temperature, control a combination of forward flow temperature and flow rate so as to ensure that the distribution system delivers said required heating power.

According to the invention, heating power losses and sources relevant for the building are approximated by taking into account at least desired indoor temperature and detected outdoor temperature. This enables a determination of the required heating power. The control system then controls a combination of forward flow temperature and flow rate so as to control the heating power transferred to the heat carrying medium, and therefore to the building.

This is different to the prior art, where any information from a house model or the like is only used to assist a conventional control model based on a temperature curve, i.e. a relationship between $T_{forward}$ and outdoor temperature.

Also prior art solutions, such as the Weathergain system, admittedly teach to determine the heating power transferred to the environment, and to use this to determine a required heating power. However, according to the prior art system, the heating power is not controlled directly, but only indirectly by using the temperature curve with a modified outdoor temperature.

According to the present invention, a dynamic model of the heating power balance of the building is used to control the heating power delivered by the heating system. This results in improved control compared a control scheme based only on flow temperature control based on outdoor temperature.

A useful way to understand the difference between prior art control and the present invention is to consider a house with a given number of radiators. In a prior art system, the system is calibrated to correspond to the house characteristics. The forward flow temperature is then determined by the outdoor temperature, possibly with corrections based on estimated heat transfer between house and environment. Now, assume that a radiator is added to a room of the house. This increase of radiator capacity will immediately increase the delivered heating power for a given forward flow temperature. The flow temperature control will not be affected, leading to an increased indoor temperature. As a consequence, the system needs to be recalibrated each time the radiator capacity is changed (when a radiator is added or removed).

According to the present invention, the forward flow temperature and/or flow rate is instead determined based on delivered heating power. When a radiator is added, the increased delivered heating power will result in a lower return temperature. The controller will therefore immediately lower the forward flow temperature (and/or reduce the flow rate), and thus adjust for the change in radiator capacity.

By controlling the heating system to maintain a heating power balance of the building, fluctuations in indoor temperature can be reduced. If the indoor temperature fluctuates, a user can be expected to adjust the system so that the lowest temperature is acceptable. This will result in periods of over heating, and thus waste of energy. By improving the heating control according to the present invention, so as to reduce the indoor temperature variations, a reduced energy consumption can be obtained.

An additional advantage is that the control system according to the invention is better adapted to handle dynamic changes. The controller will not react directly to a change in outdoor temperature, but to a dynamic model of a heating power balance for the building. This results in significantly lower margins are required to ensure a satisfactory indoor climate. The lower margins in turn result in lower required forward temperatures, and lower return temperatures. Lower return temperatures are desirable from an energy efficiency perspective, as it enables higher power efficiency in many heating systems (e.g. heat exchangers, heat pumps, etc).

In a situation where the flow rate is fixed, or controlled separately, the controller can be adapted to control only the forward temperature $T_{forward}$, preferably according to the relationship $$T_{forward} = \frac{P_{req}}{c_p flow} + T_{return},$$

where $P_{req}$ is the required heating power, $c_p$ is the specific heat capacity of the heat carrier, flow is the mass flow rate of the heat carrier, and $T_{return}$ is the return temperature of the heat carrier.

Alternatively, the controller is adapted to control also the flow rate. This will enable adapting the flow rate to allow an advantageous forward flow temperature. For example, a low flow rate will require a higher forward temperature but may result in a lower return temperature, which may be advantageous, for example in a district heating system.

On cold days it may further be advantageous to increase the flow rate, in order to avoid the need for an excessively high forward flow temperature. This can be implemented by increasing the forward flow temperature until it reaches a predefined threshold, e.g. 80° C., and then increase the flow rate instead.

The control system is preferably connected to a memory, storing parameters for defining a model of said heating power balance, which model enables approximation of the heating power losses and heating power sources.

The model can also include approximations of external heat power flows, including at least one from a group consisting of ventilation, sun radiation, tap water, electrical appliances and human beings. This further improves the performance of the system.

BRIEF DESCRIPTION OF THE DRAWINGS

This and other aspects of the present invention will now be described in more detail, with reference to the appended drawings showing a currently preferred embodiment of the invention.

DETAILED DESCRIPTION

Figure 1:
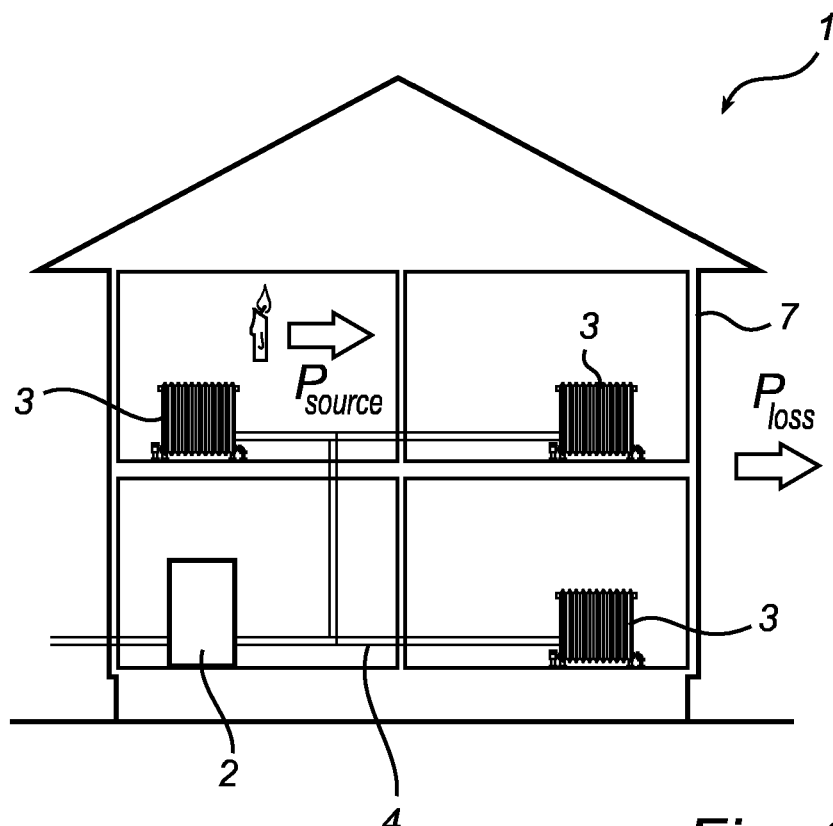
FIG. 1 is a schematic view of a building with a heating system according to an embodiment of the present invention.

FIG. 1 shows a building 1 provided with a heating system, here a water carried heating system. The system includes a central heating unit 2, radiators 3 in each room of the building 1, and a distribution system 4 of pipes for carrying a heat carrying medium, such as water, from the central unit 2 to the radiators 3. It should be noted that although the following description relates to a water based system, this is not a limitation of the invention, which is suitable also for other heat carrying mediums and distribution systems.

The present invention is based on a dynamic model heating power losses $P_{loss}$ and heating power $P_{source}$, and to determine a required heating power $P_{req}$ to be provided by the heating system in order to maintain a heating power balance. Such a heating power balance depends on interaction between the building and ambient climate, determined by the building properties and climate conditions (primarily outdoor temperature, causing a heat transfer from the indoor environment through the wall 7 of the building, but also other factors like wind and sun radiation). The balance also depends on other, man made heating power flows, such as body heat, electrical appliances, hot water flow, etc. Ventilation is another factor that may affect the heating power balance.

The heating system 1 is then controlled to provide the required heating power to the building, thereby maintaining a heating power balance and a desired indoor temperature.

Figure 2:
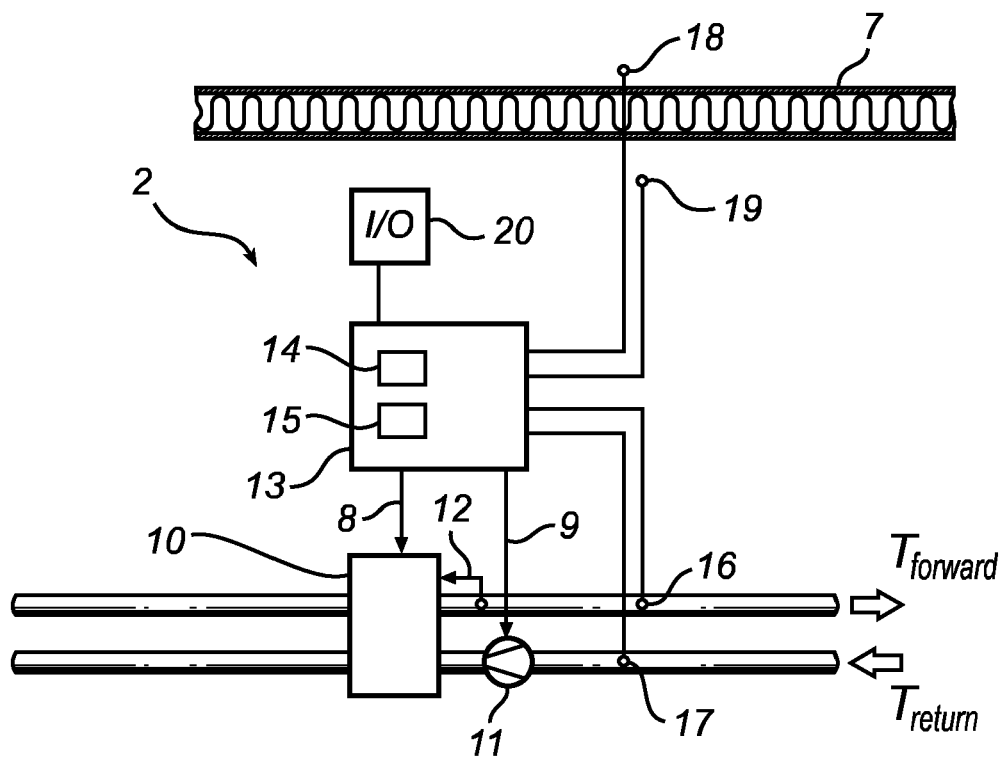
FIG. 2 is a block diagram of the central heating unit in FIG. 1.

An example of a heating unit 2 is shown in more detail in FIG. 2.

The heating unit 2 has a heater 10 for heating the water to a forward flow temperature, $T_{forward}$, and a pump 11 for circulating the water through the distribution pipes 4. The water flows through the radiators 3, where heat is delivered to the various rooms through a heat exchange process. The water is then circulated back to the heating unit 2, now with a lower return temperature, $T_{return}$.

The heater can be a simple boiler, using electric energy and/or fossil fuels to heat the water. Alternatively, the heater is a heat pump, making use of external energy from the ground or air to heat the water. Yet another alternative is to heat the water using district heating and a heat exchanger. The details of the various heating principles are not particularly relevant for the present invention, and will not be described in detail.

A controller 13 includes a processor 14 and a memory 15 storing software and data parameters. The controller 13 is arranged to control the forward flow temperature and/or the flow rate of the system, and is arranged to provide a control signal 8, 9 to the heater 10 and/or pump 11, as will be described below.

A feedback loop 12, e.g. implementing PID control, can be provided to maintain the desired forward temperature. As an alternative to a conventional control loop, a heating power based control can be applied. Such control is described in WO02/090832, herewith incorporated by reference.

A flow gauge 16 can be arranged in the distribution system 4 to provide the controller 13 with information about the heat carrier flow rate (flow) in the distribution system. For determining the heating power delivered by the heating system, it is the mass flow that is relevant. Therefore, a measure of volumetric flow provided by the gauge 16 is converted to a mass flow based on the (temperature dependent) density of the heating carrier. This conversion may be provided in the flow gauge 16 directly or in the controller 13.

A temperature sensor 17 provides the controller 13 with information about the return temperature $T_{return}$ of the water. Another temperature sensor 18 provides the controller with information about the current outdoor (ambient) temperature $T_{amb}$. Finally, a user interface 20 provides the controller with information about a desired indoor temperature, $T_{room\_sp}$, and the required data parameters to be stored in the memory 15.

Optionally, a further sensor 19 provides the controller with information about the current indoor temperature $T_{room}$.

The software in the memory 15 is adapted to calculate a required heating power by modeling a heating power balance for the building. The model includes various relationships such as an approximation of heating power transfer from the indoor environment. Examples of relationships that can be used in the model will be described below.

Based on the required heating power and a detected return temperature, the controller provides the heater 10 with a control signal 8 indicating a forward temperature set point and/or provides the pump 11 with a control signal 9 indicating a flow set point.

The set of parameters includes the various model constants required to model the heating power balance of the building, such as a heat transfer coefficient kA for the walls of the building (composed of a specific heat transfer coefficient k and the total wall area A), a heat capacity $M_{wall}c_p$ of the wall (composed of the wall mass $M_{wall}$ and its specific heat capacity $c_p$), a difference between indoor temperature and outdoor temperature $\Delta T_{eq}$ obtainable without any heating system, and proportional gain P and integration time $T_i$ of a PI control. The list is neither limiting nor exhaustive, but only serves to exemplify the parameters that may be provided. The parameters actually required will depend on the complexity of the applied model.

Figure 3:
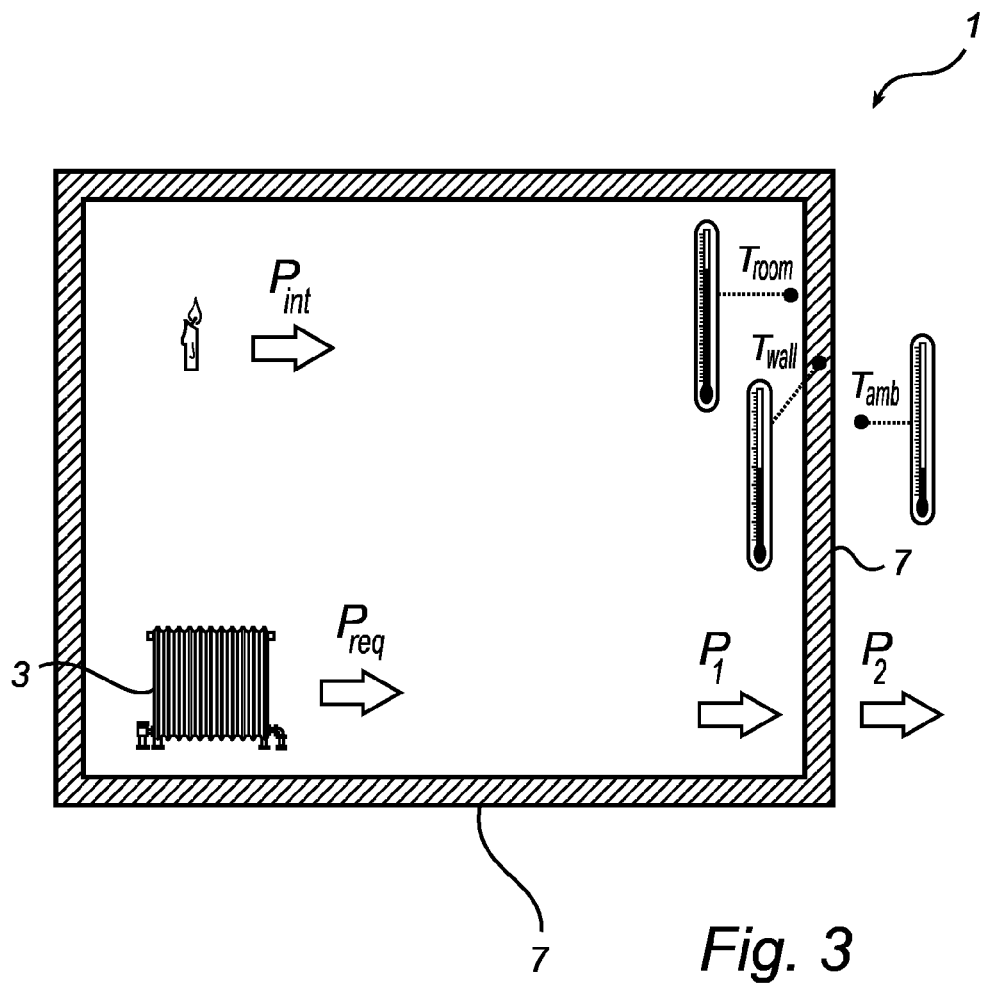
FIG. 3 is a model of heat transfer between a building and the environment.

With reference to FIG. 3, a simple model of a heating power balance of a building will be described.

Heating Power Losses

The main contribution to heating power losses is assumed to be heat transfer into the walls, due to a higher temperature indoors than outdoors. This process can be modeled by a power $P_1$ that is transferred from the indoor environment into the wall 7, and a power $P_2$ that is transferred from the wall to the outside environment. If $T_{wall}$ is assumed to be the wall temperature halfway through the wall and $T_{room\_sp}$ is the desired indoor temperature, the power $P_1$ can be approximated with $2kA*(T_{room\_sp}-T_{wall})$ where kA is the heat transfer coefficient of the wall (comprising the specific heat transfer coefficient k of the wall and the area A of the wall). It is here assumed that the wall 7 is homogenous, so that the heat transfer coefficient for half the wall is twice that of the entire wall.

In total equilibrium, $P_1$ will be equal to $P_2$, and the temperature of the wall will simply be equal to the average of the indoor temperature and the outdoor temperature. In the dynamic case, however, $P_1$ is not equal to $P_2$, and the time derivative of the wall temperature will depend on these entities according to the following relationship:

$$M_{wall} \cdot c_p \cdot \frac{dT_{wall}}{dt} = P_1 - P_2 = = 2 \cdot kA \cdot [(T_{room\_sp} - T_{wall}) - (T_{wall} - T_{amb})] =$$

$$4 \cdot kA \cdot \left[\frac{(T_{room\_sp} + T_{amb})}{2} - T_{wall}\right]$$

where $M_{wall}$ is the mass of the wall and $c_p$ is the specific heat capacity of the wall.

Extracting the time derivative of the wall temperature and integrating results in $$T_{wall} = T_{wall \atop t=0} + \int_0^\tau \frac{dT_{wall}}{dt} dt =$$

$$T_{wall \atop t=0} + 4 \cdot \frac{kA}{M_{wall} \cdot c_p} \cdot \int_0^\tau \left[\frac{(T_{room} + T_{amb})}{2} - T_{wall}\right] dt$$

This expression can be determined recursively by the processor 14 according to:

$$T_{wall \atop t=n+1} = T_{wall \atop t=n} + 4 \cdot \frac{kA}{M_{wall} \cdot c_p} \cdot \left[\frac{(T_{room\_sp} + T_{amb})}{2} - T_{wall \atop t=n}\right] \cdot \Delta t$$

Any value can be used as a starting point, but $$T_{wall \atop t=0} = \frac{T_{room\_sp \atop t=0} + T_{amb \atop t=0}}{2}$$

can be used as a suitable starting point.

In the above expressions, it should be noted that the desired indoor temperature has been used. This will provide satisfactory results, but if the control system includes an indoor temperature sensor (as indicated in FIG. 2), the desired indoor temperature can be replaced with the actual detected indoor temperature.

It can be noted that the wall temperature only changes gradually when the ambient temperature changes. This means that the heat transfer into the wall is maintained awhile, and then increases/decreases as the wall temperature changes. It is thus clear that there is ample time to adjust the radiator power when the ambient temperature changes.

Of course, this is a simplified model of the wall as divided into two halves. In reality it is a continuum, and could be modeled with a greater number of layers, e.g. using FEM technology. The temperature gradient at the inside wall surface will then determine the heat flow into the wall at any given time.

As a further improvement, the model can include inner walls and even objects in the building having their own thermal mass and heat transfer coefficient. Such inner thermal mass are not relevant as long as the inner temperature stays constant, but will serve as a compensating thermal mass when the inner temperature varies. It will have relatively large impact if the outdoor temperature raises the indoor temperature above the set point, in which case the inner thermal mass is "loaded" with heat. By modeling this effect, it is possible to better determine when to start adding power by the radiators when the outdoor temperature falls.

In a simple model, the total heating power loss $P_{loss}$ can be approximated with the heat transfer $P_1$. In reality, however, several other processes also represent heating power losses.

One relatively important factor is ventilation, and in an improved model, the heating power loss from ventilation can be monitored and modeled. In such a model, the ventilation loss, $P_{vent}$, can be approximated by $$P_{vent} = c_p \text{flow}(T_{in} - T_{out}),$$

where flow is the mass flow of air, $T_{in}$ is the temperature of incoming air, Tout is the temperature of exhaust air, and $c_p$ is the specific heat capacity of air. The controller can be connected to a flow sensor arranged in the ventilation ducts of the building in order to obtain information about the ventilation flow rate. In simple cases, $T_{in}$, can be approximated with $T_{amb}$, and $T_{out}$ with $T_{room}$ (or $T_{room\_sp}$). In a more complex system, including for example a heater for heating incoming ventilation air, or a heat exchanger connected to the outgoing air, sensors can be provided to measure $T_{in}$ and $T_{out}$, and possibly also the performance of the heat exchanger.

Another process is tap water, where heat may be transferred from hot water into the building environment. In principle, this can be modeled in a similar way, by detecting flow and temperatures. However, the heating power from tap water is a complex process, and it is preferably modeled in a simpler way, using basic assumptions of hat water consumption patterns.

Heating Power Sources

The internal power sources $P_{int}$ can be approximated as a constant $kA\Delta T_{eq}$, where kA is again the heat transfer coefficient of the wall, and $\Delta T_{eq}$ is the equilibrium temperature difference ($T_{room}-T_{amb}$) that can be obtained without any additional heating. (If for example an indoor temperature of 21° C. is obtained when the outdoor temperature is 16° C., the internally generated heating power is 5kA.)

Of course, in reality $P_{int}$ is not constant, but depends on the activity in the building (number of persons at home, appliances running, etc.). In an improved model, such factors can be monitored and modeled. The heating power from electrical appliances for example can be approximated with the consumed electrical power, as essentially all consumed electrical power at one point will be transformed into heat.

In addition to this, the heating power sources include external sources $P_{ext}$, such as incident sun light. External sources can also be monitored and modeled, for example by connecting a sun light sensor to the controller.

Heat Balance

With the above simplified expressions for $P_{loss}$ and $P_{source}$ result in a required heating power, $P_{req}$:

$$P_{req}=P_1-P_{int}=2kA\cdot(T_{room\_sp}-T_{wall})-kA\cdot\Delta T_{eq}$$

In order to improve performance even further, the expression for $P_{req}$ can be completed with a temperature control term. In case of a simple PI control, such a control term will have the following appearance:

$$P*\left(\varepsilon-\frac{1}{Ti}*\int_0^t \varepsilon\cdot dt\right)$$

where $\varepsilon$ is the temperature error $T_{room}-T_{room\_sp}$, P is the proportional gain, and $T_i$ is the integration time for the I-part of the PI regulator.

With $P_{req}$ determined, the controller can now proceed to determining the required combination of forward flow temperature and flow rate of the system, in order to deliver this heating power to the building. The relationship used for this is:

$$P_{req}=c_p\text{flow}(T_{forward}-T_{return}),$$

where $c_p$ is the specific heat capacity of the heat carrier and flow is the mass flow rate.

Returning to FIG. 2, each building is provided with its own heater, and can thus adjust the forward flow temperature.

According to one embodiment, the flow rate is fixed, or at least not controlled by the heating system. In this case, the control is effected only on the forward temperature, according to:

$$T_{forward}=\frac{P_{req}}{c_p\text{flow}}+T_{return}$$

This forward temperature set point is communicated to the heater by control signal 8, and maintained by the heater by means of the feedback loop 12.

If the controller is arranged to control also the flow rate, a flow rate set point is communicated to the pump 11 by control signal 9. By increasing the flow rate, an excessively high forward flow temperature can be avoided.

Figure 4:
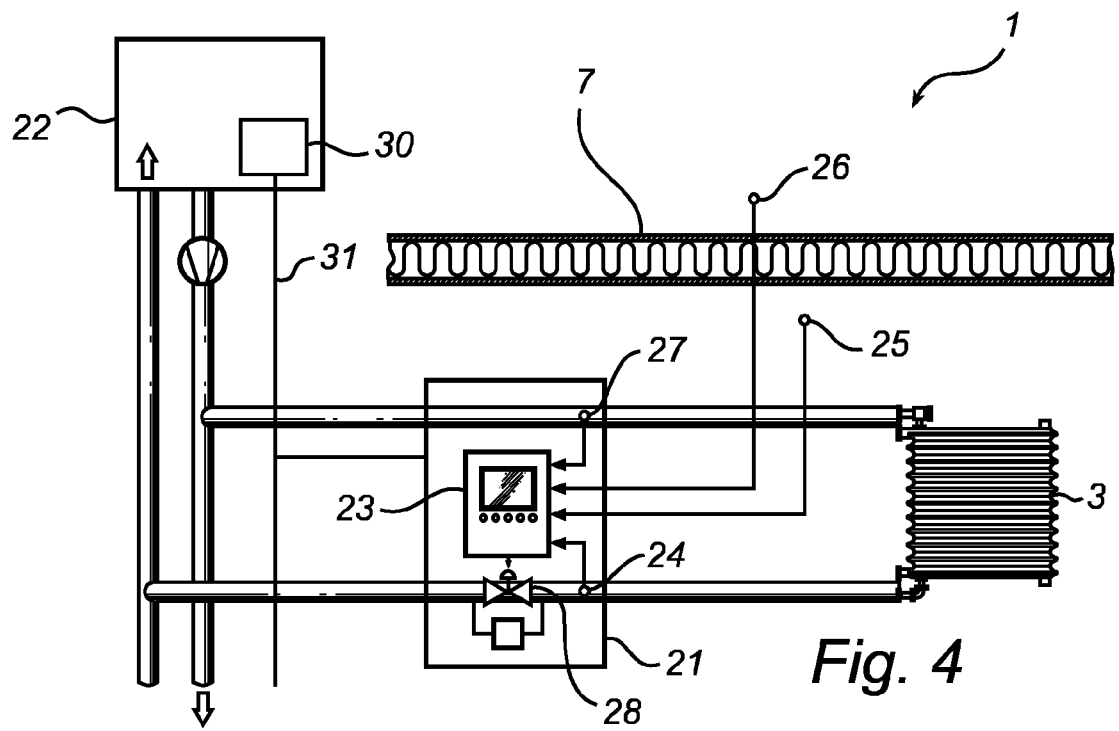
FIG. 4 is schematic view of a heating system for a plurality of buildings, according to a second embodiment of the present invention.

FIG. 4 shows a heating system according to a further embodiment of the invention. In this case, the heating unit 21 of each building does not control the temperature of the heat carrying medium. Instead, a heating central 22 controls the forward flow temperature of a heat carrying medium that is distributed to the various buildings in an entire block or the like.

The heating central 22 can comprise a heat exchanger connected to a district heating system, or be a local heating plant, driven by e.g. electricity or other fuels.

In each building is a heating unit 21 provided with a controller 23 according to another embodiment of the invention. Similar to the controller in FIG. 2, sensors 24, 25 and 26 provide the controller with information about the return temperature, indoor temperature and outdoor temperature. In addition, a sensor 27 provides the controller with information about the forward flow temperature, which in this case is outside the control of the controller. The controller output is connected to a flow valve 28, adapted to regulate the flow rate of the heat distribution system of the building.

The controller determines the heating power requirement in a similar way as described above. In order to deliver the required heating power, the controller adjusts the flow rate of the distribution system using the flow valve. The flow rate can then be determined according to:

$$\text{flow}=\frac{P_{req}}{c_p(T_{forward}-T_{return})}.$$

The heating central can further be provided with a controller 30 according to yet another embodiment of the invention. This controller can be adapted to determine the heating power requirement for the entire building complex, preferably using information from a communication link 31 connecting the controllers 23 in each building. Based on this heating power requirement, the controller can adjust the forward flow temperature of the heat carrying medium based on flow rate and return temperature, in a similar way as was described above.

The invention is useful in any heating system where the main part of the heating sources are controllable, including all central heating systems, carried by mediums in liquid and/or gas form. In some buildings, a combination of air and water carried systems are used. In such cases, a certain heating power is required to heat the air to the desired temperature, based on the current air flow and the heat of the incoming air. Only then are the principles discussed above used to determine the required heating power from the radiators. The heating power delivered by the air carried heating is then considered as an internal heating power source.

The skilled man realized that modifications can be made to the embodiments descried above, without departing from the inventive concept as defined by the appended claims. For example, the components of the heating system in FIGS. 2 and 4 may be substituted and/or rearranged, as long as the intended function can be accomplished. Likewise, the description of a model of the heating power balance for a building is exemplifying. Many of the relationships and assumptions may be replaced as long as an approximation of required heating power is provided.

The invention claimed is:

1. A control system for controlling an indoor heating system for an indoor environment of a building in accordance with a desired indoor temperature, comprising:
a sensor for detecting an outdoor temperature,
a sensor for detecting a return temperature $T_{return}$ of a heat carrying medium circulated in a heat distribution system with a flow rate,
a controller adapted to:
determine a required heating power, $P_{req}$, to be delivered by said heat distribution system to maintain a heating power balance according to $P_{req}=P_{loss}-P_{source}$,
where $P_{loss}$ is an approximation of heating power losses from said building, and includes a dynamic approximation of heating power transfer through walls of the building, based on at least said desired indoor temperature ($T_{room}$), said detected outdoor temperature ($T_{amb}$), a heat transfer coefficient of the wall (kA), and a heat capacity of the wall ($Mc_p$), and $P_{source}$ is an approximation of heating power sources external to said heating system, and
based on the detected return temperature, control a combination of forward flow temperature and the flow rate so as to ensure that the distribution system delivers said required heating power.

2. The control system according to claim 1, further comprising a flow sensor for detecting said flow rate, and wherein the controller is adapted to control a forward flow temperature based on the detected flow rate.

3. The control system according to claim 2, wherein the forward flow temperature $T_{forward}$ is determined according to the relationship $$T_{forward} = \frac{P_{req}}{c_p \text{ flow}} + T_{return},$$

where $c_p$ is the specific heat capacity of the heat carrier, flow is the detected flow rate, and $T_{return}$ is the detected return temperature of the heat carrier.

4. The control system according to claim 1, wherein the controller is adapted to control a mass flow rate based on a given forward flow temperature.

5. The control system according to claim 4, wherein the mass flow rate (flow) is determined according to the relationship:

$$\text{flow} = \frac{P_{req}}{c_p(T_{forward} - T_{return})},$$

where $c_p$ is the specific heat capacity of the heat carrier, $T_{forward}$ is the forward flow temperature, and $T_{return}$ is the detected return temperature of the heat carrier.

6. The control system according to claim 1, wherein said controller is connected to a memory, storing parameters for defining a model of said heating power balance, said model enabling approximation of said heating power losses and heating power sources.

7. The control system according to claim 1, wherein said heating power transfer, $P_1$, through walls of the building, is approximated according to:

$$P_1 = 2kA \cdot (T_{room\_sp} - T_{wall}),$$

where k is the specific heat transfer coefficient of the entire wall, A is the area of the wall, $T_{room\_sp}$ is the desired indoor temperature, and $T_{wall}$ is the temperature in the middle of the wall.

8. The control system according to claim 7, wherein the controller is adapted to determine $T_{wall}$ recursively according to:

$$T_{wall}\big|_{t=n+1} = T_{wall}\big|_{t=n} + 4 \cdot \frac{kA}{M_{wall} \cdot c_p} \cdot \left[\frac{(T_{room\_sp} + T_{amb})}{2} - T_{wall}\big|_{t=n}\right] \cdot \Delta t,$$

where t is the time, $T_{room\_sp}$ is the desired indoor temperature, $T_{amb}$ is the detected outdoor temperature, k is the specific heat transfer coefficient of the entire wall, A is the area of the wall, $M_{wall}$ is the mass of the wall and $c_p$ is the specific heat capacity of the wall.

9. The control system according to claim 8, wherein the controller is adapted to use $$T_{wall}(t=0) = \frac{(T_{room\_sp} + T_{amb})}{2}$$

as a starting value.

10. The control system according to claim 1, wherein the control system further comprises a sensor for detecting actual indoor temperature, and wherein the controller is further adapted to apply a temperature control term based on said detected indoor temperature when determining the required heating power.

11. The control system according to claim 10, wherein said control term is $$P * \left(\varepsilon - \frac{1}{Ti} * \int_0^t \varepsilon \cdot dt\right),$$

where t is the time, $\varepsilon$ equals $T_{room\_sp} - T_{room}$, where $T_{room\_sp}$ is the desired indoor temperature and $T_{room}$ is the detected indoor temperature.

12. The control system according to claim 6, wherein said model includes an approximation of internally generated heating power $P_{int}$ as a constant according to:

$$P_{int} = kA \cdot \Delta T_{eq},$$

where k is the specific heat transfer coefficient of the entire wall, A is the area of the wall, and $T_{eq}$ is the obtainable difference between indoor temperature and outdoor temperature without any heating power contribution from the heating system.

13. The control system according to claim 6, wherein said model includes approximations of external heat power flows, including at least one from a group consisting of ventilation, sun radiation, tap water, electrical appliances and human beings.

14. A method for controlling an indoor heating system for an indoor environment of a building in accordance with a desired indoor temperature, comprising:
detecting an outdoor temperature;

detecting a return temperature $T_{return}$ of a heat carrying medium circulated in a heat distribution system with a flow rate;

determining a required heating power, $P_{req}$, to be delivered by said heat distribution system to maintain a heating power balance according to $P_{req}=P_{loss}-P_{source}$, where P.sub.loss is an approximation of heating power losses from said building, and includes a dynamic approximation of heating power transfer through walls of the building, based on at least said desired indoor temperature (T.sub.room), said detected outdoor temperature (T.sub.amb), a heat transfer coefficient of the wall (kA), and a heat capacity of the wall (Mc.sub.p), and P.sub.source is an approximation of heating power sources external to said heating system; and based on the detected return temperature, controlling a combination of forward flow temperature and the flow rate so as to ensure that the distribution system delivers said required heating power.

15. The method according to claim 14, further comprising detecting said flow rate, and controlling a forward flow temperature based on the detected flow rate.

16. The method according to claim 14, further comprising controlling a mass flow rate based on a given forward flow temperature.

17. The method according to claim 14, wherein said heating power transfer, $P_1$, through walls of the building, is approximated according to:

$$P_1 = 2kA \cdot (T_{room\_sp} - T_{wall}),$$

where k is the specific heat transfer coefficient of the entire wall, A is the area of the wall, $T_{room\_sp}$ is the desired indoor temperature, and $T_{wall}$ is the temperature in the middle of the wall.

18. The method according to claim 17, wherein $T_{wall}$ is determined recursively according to:

$$T_{wall}\underset{t=n+1}{} = T_{wall}\underset{t=n}{} + 4 \cdot \frac{kA}{M_{wall} \cdot c_p} \cdot \left[ \frac{(T_{room\_sp} + T_{amb})}{2} - T_{wall}\underset{t=n}{} \right] \cdot \Delta t,$$

where t is the time, $T_{room\_sp}$ is the desired indoor temperature, $T_{amb}$ is the detected outdoor temperature, k is the specific heat transfer coefficient of the entire wall, A is the area of the wall, $M_{wall}$ is the mass of the wall and $c_p$, is the specific heat capacity of the wall.

19. The method according to claim 14, further comprising detecting actual indoor temperature, and applying a temperature control term based on said detected indoor temperature when determining the required heating power.

20. The method according to claim 14, further comprising approximating internally generated heating power $P_{int}$ as a constant according to:

$$P_{int} = kA \cdot \Delta T_{eq},$$

where k is the specific heat transfer coefficient of the entire wall, A is the area of the wall, and $T_{eq}$ is the obtainable difference between indoor temperature and outdoor temperature without any heating power contribution from the heating system.

* * * * *

UNITED STATES PATENT AND TRADEMARK OFFICE
CERTIFICATE OF CORRECTION

| | | |
|---|---|---|
| PATENT NO. | : 8,086,353 B2 | Page 1 of 1 |
| APPLICATION NO. | : 12/448641 | |
| DATED | : December 27, 2011 | |
| INVENTOR(S) | : Matts Lindgren et al. | |

It is certified that error appears in the above-identified patent and that said Letters Patent is hereby corrected as shown below:

Title page, item (73) Assignee should read as follows: Nordiq Göteborg AB, Västra Frölunda (SE)

Signed and Sealed this
Thirteenth Day of March, 2012

David J. Kappos
*Director of the United States Patent and Trademark Office*